United States Patent [19]

Debord et al.

[11] 4,104,457

[45] Aug. 1, 1978

[54] BULK POLYMERIZATION OF VINYL CHLORIDE TO CONTROL GRAIN SIZE

[75] Inventors: Daniel Debord, St-Auban; Salomon Soussan, St-Fons, both of France

[73] Assignee: Rhone-Progil, Paris, France

[21] Appl. No.: 765,414

[22] Filed: Feb. 3, 1977

Related U.S. Application Data

[63] Continuation of Ser. No. 522,571, Nov. 11, 1974, abandoned, which is a continuation of Ser. No. 322,501, Jan. 10, 1973, abandoned.

[30] Foreign Application Priority Data

Jan. 11, 1972 [FR] France ................................ 72.00766

[51] Int. Cl.$^2$ ............................................. C08F 2/02
[52] U.S. Cl. .................................... 526/203; 526/88; 526/201; 526/202; 526/273; 526/317; 526/320; 526/327; 526/328.5; 526/329.4; 526/331; 526/909; 260/884
[58] Field of Search ................. 526/88, 201, 203, 202; 260/884

[56] References Cited

U.S. PATENT DOCUMENTS

| | | | |
|---|---|---|---|
| 3,480,606 | 11/1969 | Thomas | 260/92.8 |
| 3,522,227 | 7/1970 | Thomas | 260/92.8 |
| 3,562,237 | 2/1971 | Thomas | 260/92.8 |
| 3,622,553 | 11/1971 | Cines | 260/92.8 |
| 3,625,932 | 12/1971 | Green | 260/92.8 |
| 3,687,919 | 8/1972 | Thomas | 260/87.1 |
| 3,687,923 | 8/1972 | Thomas | 260/92.8 R |

Primary Examiner—Stanford M. Levin

[57] ABSTRACT

Polymers and copolymers of vinyl chloride having a narrow grain size distribution and a large average mean diameter and a process for the preparation of same in which the polymerization of vinyl chloride is carried out in the presence of a prepolymer composition obtained by polymerization, under high turbulence, of a monomeric composition containing vinyl chloride and acrylic acid or methacrylic acid, an aliphatic ester thereof or a diester of a dihydric alcohol.

7 Claims, No Drawings

BULK POLYMERIZATION OF VINYL CHLORIDE TO CONTROL GRAIN SIZE

This is a continuation of application Ser. No. 522,571, filed Nov. 11, 1974; which is a continuation of application Ser. No. 322,501, filed Jan. 10, 1973, both abandoned.

The present invention relates to a process for preparing, in bulk, polymers and copolymers based on vinyl chloride and to resins having a grain size distribution comprising a narrow population of grains of large mean diameter resulting therefrom.

It has been suggested to carry out the preparation of polymers and copolymers based on vinyl chloride by polymerization or copolymerization in bulk by a process of carrying out the operations of polymerization or copolymerization with a degree of agitation as high as possible during a first phase, until the extent of polymerization reaches 7 to 15%, and preferably about 8 to 12%, and then reducing the speed of agitation during a second phase of the polymerization reaction to a rate as low as possible, but with the ratio of agitation remaining sufficient to ensure good thermal transfer to the reaction medium, and continuing the second phase under these conditions until the end of the reaction.

It has also been suggested to carry out these polymerizations or copolymerizations in bulk either in two stages carried out at different speeds of agitation, rapid then slow, in a single autoclave. According to another method which is particularly important, initial prepolymerization is carried out under agitation at high turbulence, and the second, final polymerization is carried out at a low agitation speed with the two stages being carried out in separate vessels, that is, a prepolymerizer and a polymerizer. These methods and their variations have been described in detail in French Patents and Certificates of Addition of Societe Produite Chimiques Pechiney Saint Gobain Nos. 1,357,736; 83,377; 83,383; 83,714, filed respectively on 2-26-63; 4-1-63; 4-2-63; 5-2-63; Nos. 1,382,072; 84,958; 84,965; 84,966; 85,672; 89,025, filed respectively on 3-1-63; 4-26-63; 9-27-63; 9-30-63; 4-30-64; 10-14-65; Nos. 1,436,744; 87,620; 87,623; 87,625, 87,626, filed respectively 3-17-65; 3-18-65; 3-19-65; 3-22-65; 3-23-65; No. 1,450,464, filed on 3-17-1965; No. 1,574,734, filed on 3-5-1968 and in French patent application PV 148,881, filed on 4-22-1968.

These processes and their variants allow the preparation, in a reproducible manner, of polymers and copolymers of vinyl chloride having useful characteristics of high apparent density and a narrow grain size distribution, which may be varied according to requirements.

However, serious difficulties have been encountered when these methods of preparation have been used, employing large capacity autoclaves, to prepare resins having a grain distribution comprising a narrow statistical population of grain sizes and a large mean diameter.

It is known that, all other things being equal, the diameter of grains obtained at the end of the second phase of the reaction is higher when the speed of agitation during the first phase is lower.

When it is desired to manufacture grains of large diameter, it is therefore advisable to employ agitation speeds which are relatively low during the first phase of the reaction. However, this is not possible with autoclaves of large volume without causing decantation of the polymer during formation, which entails uncontrolled reagglomeration.

It has now been found that it is possible, during the first phase of the reaction, to retain agitation speeds compatible with a good dispersion of polymer during its formation and which allow autoclaves of large capacity to be used, when preparing resins of a narrow grain size distribution and a large average grain diameter.

According to the invention, there is provided a process for the preparation of polymers and copolymers of vinyl chloride having a relatively narrow grain size distribution and a relatively large average grain diameter in which polymerization is carried out under low agitation of a reaction medium comprising a prepolymeric composition (A), said prepolymeric composition being obtained by polymerization under high turbulence, to an extent of about 5 to 15%, of a monomeric composition based on vinyl chloride in the presence of an auxiliary compound selected from (a) acrylic acid or methacrylic acid, (b) the acrylate or methacrylate of a substituted or unsubstituted aliphatic group, (c) ethylene glycol dimethacrylate or polyethylene glycol dimethacrylate or (d) propylene glycol dimethacrylate or polypropylene glycol dimethacrylate.

The aliphatic radical of the acrylates and methacrylates may be a radical having a straight or branched chain, saturated or unsaturated, or cyclic, optionally substituted, preferably having 1 to 24 carbon atoms. The aliphatic group may be substituted by an alcohol epoxide, etheroxide or polyetheroxide functional group. In the preferred practice of the invention, the aliphatic group is an alkyl group which is straight or branch-chained containing 1 to 24 carbon atoms, a cycloalkyl group, such as cyclopentyl, cyclohexyl, etc., an alkeno group containing 10 carbon atoms, such as vinyl, allyl, butenyl, as well as the substituted derivatives thereof wherein the substituent is one of those functional groups referred to above. For example, the aliphatic group can be an alkylene glycol group or a polyalkylene glycol group.

According to one preferred embodiment of the invention, the reaction medium in which the final polymerization phase under low agitation is carried out is obtained by mixing (a) the prepolymeric composition A and
(b) a prepolymeric composition B obtained by polymerization up to an extent of about 5 to 15% under agitation with high turbulence of a monomeric composition based on vinyl chloride having no auxiliary compound.

According to another preferred embodiment of the process of the invention, the reaction medium in which the final phase of polymerization under low agitation is carried out is obtained by mixing (a) the prepolymeric composition (A) and
(b) a complementary quantity of a monomeric composition based on vinyl chloride having no auxiliary compounds.

According to a third preferred embodiment of the invention, the reaction medium in which the final polymerization phase at a low agitation speed is carried out is obtained by mixing (a) the prepolymeric composition (A)
(b) a prepolymeric composition (B) obtained by polymerization up to an extent of about 5 to 15% under agitation at high turbulence of a monomeric composition based on vinyl chloride containing no auxiliary compound, and (c) an additional quantity of a monomeric composition based on vinyl chloride containing no auxiliary compound.

It will be understood that the term "prepolymeric composition" means the product formed by a partial polymerization of a monomeric composition based on vinyl chloride, thus containing prepolymer particles already formed, which has not been subjected to total degasification.

A partial degassing operation can, however, be carried out, if desired, on the medium formed by at least one of the prepolymeric compositions used in order to adjust the quantity of reaction medium on which the final polymerization phase under slow agitation is carried out.

The aliphatic acrylates and methacrylates which may be employed in the process of the invention include those of methyl, ethyl, allyl, cyclohexyl, methyl cyclohexyl, 2-ethyl hexyl, glycidyl, ethylene glycol, propylene glycol, polyethylene glycol and polypropylene glycol.

Among the polyethylene glycol dimethacrylates there may be used triethylene glycol dimethacrylate, and the dimethacrylate of tetraethylene glycol.

Among the polypropylene glycol dimethacrylates there may be employed tripropylene glycol dimethacrylate. In the case in which no prepolymer other than the prepolymeric composition (A) is used, at the end of the polymerization a polymer having a grain size distribution having a single statistical population is obtained.

In the case in which the prepolymeric composition (B) is also used, there is obtained at the end of polymerization a polymer having a grain size distribution comprising two populations.

The preferred proportion of said auxiliary compound introduced in the monomeric composition for preparation of prepolymeric composition (A) is a function of its nature and is generally from 0.05 to 2% by weight of the said monomeric composition. For a given auxiliary compound this preferred proportion is greater, other things being equal, as the desired average diameter of the grains is greater. However, when only the prepolymeric composition (A) is used, an excessive proportion of auxiliary compound leads to the preparation of resins having an increased percentage of coarse products of almost no commercial value and also an increased percentage of fines which disadvantageously affect the flowability of mixtures prepared from said resins and hence the feeding of the mixtures to processing machines.

It follows that in the case where no other prepolymeric composition other than (A) is used, the carrying out of the process according to the invention is limited in practice to the preparation of polymers and copolymers of which the grain size distribution contains a single population, formed of grains of which the mean diameter is less than about 320 microns and generally from 150 to 270 microns.

In the case in which the mean diameter of the grains of the population of grains of greater diameter which is desired is higher than 270 microns, it is preferable to use the prepolymeric composition (B). There is then obtained a polymer and copolymer of which the grain size distribution comprises a population of grains of mean diameter between 270 and 600 microns and a population of grains of mean diameter between 60 and 140 microns. In the case in which the mean diameters of the grains of the two populations are sufficiently far apart, the two fractions may easily be separated if desired by any known means, for example by sieving. The proportion by weight of the population of grains of large diameter is greater, other things being equal, when the contents by weight of the particles of prepolymeric composition (A) in relation to the total weight of prepolymer particles in the reaction medium on which is carried out the polymerization final phase under slow agitation is higher. This content varies generally from 50 to 100%.

Using the process of the invention, it has been found possible to obtain polymeric and copolymeric resins based on vinyl chloride having a grain size distribution comprising a narrow population of grains of which the mean diameter is from 150 to 600 microns and of which the mass per unit volume (apparent density) is from 0.40 to 0.75 grams per cubic centimeter.

The resins obtained by the process of the invention are particularly suitable for the preparation by extrusion of flexible, shaped articles.

The following examples are given to illustrate preferred embodiments of the invention. In these examples the viscosity index is the AFNOR index measured according to NFT Standard No. 51013.

EXAMPLE 1

This example is given for comparison.

Into a prepolymerizer of 200 liters capacity of stainless steel having an agitator formed by a turbine of the "Lightnin" type having 6 flat blades of 215 millimeters diameter there is introduced 185 kilograms of vinyl chloride and the apparatus is purged by degassing of 15 kilograms of vinyl chloride. There is also introduced 18.5 grams of ethyl hexyl peroxy dicarbonate corresponding to 0.85 grams of active oxygen. The speed of agitation is adjusted at 400 r.p.m.

The temperature of the reaction medium in the prepolymerizer is raised to and held at 68° C which corresponds to a relative pressure of 11.5 bars in the prepolymerizer.

After 1 hour of prepolymerization, the extent of polymerization being approximately 12%, the prepolymeric composition is transferred to a horizontal polymerizer of 500 liters capacity of stainless steel, equipped with a frame agitator, previously purged by degassing of 20kilograms of vinyl chloride and containing 92 grams of ethyl hexyl peroxy dicarbonate corresponding to 4.25 grams of active oxygen.

The agitation speed is adjusted at 30 r.p.m. The polymerization temperature is raised rapidly to and maintained at 50° C corresponding to a relative pressure of 7 bars in the polymerizer. The polymerization in the polymerizer lasts 5 hours. There is recovered after degassing with a yield of 80% a powder polymer having a viscosity index of 120. The portion of said polymer passing a sieve having 630 microns aperture represents 92% by weight of the polymer and has an apparent density of 0.54 g/cm$^3$. The grain size distribution comprises a single population of grains of which the mean diameter is 119 microns, as shown in Table 1 below, which indicates the percentages by weight of fines passing through different sieves.

Table 1

| Size of apertures in microns | 630 | 400 | 315 | 250 | 200 | 160 | 125 | 100 | 80 | 63 | 40 |
| --- | --- | --- | --- | --- | --- | --- | --- | --- | --- | --- | --- |

Table 1-continued

| % fines | 100 | 100 | 100 | 100 | 99 | 99 | 72 | 10 | 2 | 2 | 0 |

EXAMPLE 2

The procedure of example 1 is followed but there is introduced into the prepolymerizer 170 grams of triethylene glycol dimethacrylate. The reaction proceeds in the same manner.

There is recovered with a yield of 80% a powder polymer having a viscosity index of 120. The part of said polymer passing a sieve having apertures of 630 microns represents 93% by weight and has an apparent density of 0.54 g/cm$^3$. The grain size distribution comprises a single population of grains of which the mean diameter is 181 microns, as shown in the Table 2 below, which indicates the percentages by weight of fines passing different sieves.

Table 2

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 100 | 100 | 98 | 52 | 45 | 6 | 4 | 4 | 4 | 2 |

EXAMPLE 3

This example is given as a comparative example.
The apparatus is that used in Example 1.

There is introduced in the prepolymerizer 135 kilograms of vinyl chloride and the apparatus is purged by degassing of 10 kilograms of vinyl chloride. There is also introduced 13.5 grams of ethyl hexyl peroxy dicarbonate corresponding to 0.625 grams of active oxygen. The speed of agitation is adjusted to 400 r.p.m. The temperature of the reaction medium in the prepolymerizer is adjusted to and maintained at 68° c which corresponds to a relative pressure of 11.5 bars in the prepolymerizer.

After 1 hour of prepolymerization, the degree of conversion being about 12%, the prepolymeric composition is transferred into the polymerizer which is previously purged by degasing of 20 kilograms of vinyl chloride and containing 80 kilograms of vinyl chloride and 108 grams of ethyl hexyl peroxy dicarbonate corresponding to 5 grams of active oxygen. The agitation speed is adjusted to 30 r.p.m. The temperature of polymerization is adjusted rapidly to and maintained at 50° C which corresponds to a relative pressure of 7 bars in the polymerizer. Polymerization in the polymerizer lasts for 4.75 hours.

There is recovered after degassing, with a yield of 80%, a polymer powder of which the characteristics are the same as the polymer obtained in Example 1.

EXAMPLE 4

The procedure of Example 3 is used but there is introduced into the prepolymerizer 200 grms triethylene glycol dimethacrylate. The reaction is carried out in the same manner.

There is obtained, with a yield of 80%, a powder polymer haing characteristics the samme as those of the polymer obtained in Example 2

EXAMPLE 5

This example is given as a comparative example.
The apparatus is the same as that used in Example 1.

There is introduced in the prepolymerizer 110 kilograms of vinyl chloride and the apparatus is purged be degassing of 10 kilograms of vinyl chloride. There is also introduced 8 kilograms of vinyl acetate and 7.5 grams of acetyl cyclohexane sulfonyl peroxide corresponding to 0.540 grams of active oxygen. The speed of agitation is adjusted to 400 r.p.m. The temperature of the reaction mixture in the prepolymerizer is raised to and maintained at 67° C which corresponds to a relative pressure of 10.5 bars in the prepolymerizer.

After 1 hour of prepolymerization, with the extent of polymerization being about 12% the prepolymeric composition is transferred into the polymerizer previously purged by degassing of 20 kilograms of vinyl chloride and containing 92 kilograms of vinyl chloride, and 108 grams of ethyl hexyl peroxy dicarbonate corresponding to 5 grams of active oxygen. The agitation speed is adjusted to 30 r.p.m. The temperature of polymerization is raised rapidly and maintained at 62° C which corresponds to a relative pressure of 9.5 bars in the polymerizer. Polymerization in the polymerizer takes 4.5 hours.

There is discovered after degassing, with a yield of 75%, a powder copolymer of vinyl chloride and vinyl acetate composed of 98% by weight of vinyl chloride and 2% by weight of vinyl acetate of viscosity index 82. The part of said copolymer passing a sieve of aperture size 630 microns represents 92% by weight of the copolymer and has an apparent density of 0.65 g/cm$^3$ and a grain size distribution comprising a single population of grains of which the mean diameter is 121 microns, as shown in Table 3 below, which indicates the weight percentages of fines passing different sieves.

Table 3

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 100 | 100 | 99 | 99 | 98 | 46 | 12 | 12 | 11 | 8 |

EXAMPLE 6

The procedure of Example 5 is followed by introducing into the prepolymerizer 200 grams of triethylene glycol dimethacrylate. The reaction is carried out in the same manner.

There is recovered with a yield of λ% a powder copolymer of vinylacetate comprising 98% by weight of vinyl chloride and 2% by weight of vinyl acetate of viscosity index 84. The part of said copolymer passing a sieve of aperture size of 630 microns represents 93% by weight and has an apparent volumetric mas of 0.65 g/cm$^3$. The grain size distribution comprises a single population of grains of which the mean dimeter is 177 microns, as shown in Table 4 below, which shows the percentages by weight of fines passing different sieves Table 4

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 98 | 90 | 90 | 63 | 57 | 17 | 12 | 10 | 10 | 10 |

EXAMPLE 7

This example is given for comparison.

The apparatus is that used in Example 1.

There is introduced in the prepolymerizer 165 kilograms of vinyl chloride and the apparatus is purged by degassing 15 kilograms of vinyl chloride. There is also introduced 10.4 grams of acetyl cyclohexane sulfonyl peroxide corresponding to 0.750 grams of active oxygen. The speed of stirring is adjusted to 400 r.p.m. The temperature of the reaction medium in the prepolymerizer is adjusted to and maintained at 62° C which corresponds to a relative pressure of 9.5 bars in the prepolymerizer.

After 1 hour of prepolymerization, the percentage conversion being about 12%, the prepolymeric composition is transferred to a polymerizer previously purged by degassing of 20 kilograms of vinyl chloride, and containing 28 kilograms of vinyl chloride, 1082 grams of ethyl hexyl peroxy dicarbonate corresponding to 50 grams of active oxygen. There is introduced into the polymerizer 22 kilograms of propylene. The speed of agitation is adjusted to 30 r.p.m. The temperature of polymerization is rapidly adjusted to and maintained at 52° C for 2 hours, then adjusted to 57° C which corresponds to a relative pressure of 10.5 bars in the polymerizer. Polymerization in the polymerizer lasts 5.25 hours.

There is recovered after degassing with a yield of 66% a powder copolymer of vinyl chloride and propylene composed of 95% by weight of vinyl chloride and 5% by weight of propylene of viscosity index 59. The part of said copolymer passing a sieve of aperture size 630 microns represents 90% by weight and has an apparent density of 0.71 g/cm³ and a grain size distribution comprising a single population of grains of which the mean diameter is 128 microns as shown in the Table 5 below which indicates the percentages by weight of fines passing different sieves.

Table 5

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 98 | 94 | 94 | 94 | 93 | 80 | 27 | 2 | 1 | 0 |

EXAMPLE 8

The method of Example 7 is followed, except that 200 grams of triethylene glycol dimethacrylate are introduced into the prepolymerizer. The reaction is carried out in the same manner.

There is recovered with a yield of 70% a powder copolymer of vinyl chloride and propylene containing 95% by weight of vinyl chloride and 5% by weight of propylene of viscosity index 59. The part of said copolymer passing a sieve of apertures of 630 microns represents 94% by weight and has an apparent density of 0.67 g/cm³ with a grain size distribution comprising a single population of grains of which the mean diameter is 187 microns, as shown in Table 6 below, which indicates the percentages in weight of fines passing different sieves.

Table 6

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 98 | 91 | 90 | 58 | 52 | 10 | 8 | 7 | 4 | 3 |

EXAMPLE 9

This example is given for comparison.

The apparatus is that used in Example 1.

There is introduced into the prepolymerizer 127 kilograms of vinyl chloride and the apparatus is purged by degassing 12 kilograms of vinyl chloride. There is introduced 8.3 kilograms of vinyl acetate and 8.6 grams of acetyl cyclohexane sulfonyl peroxide corresponding to 0.620 grams of active oxygen. The speed of agitation is adjusted to 400 r.p.m. The temperature of the reaction medium in the prepolymerizer is adjusted to and maintained at 67° C which corresponds to a relative pressure of 10.5 bars in the prepolymerizer.

After 1 hour of prepolymerization the degree of conversion is about 12% and the prepolymeric composition is transferred to a polymerizer previously purged by degassing of 20 kilograms of vinyl chloride and containing 77 kilograms of vinyl chloride and 229 grams of octyl peroxy dicarbonate corresponding to 10.6 grams of active oxygen. There is then introduced into the polymerizer 10 kilograms of propylene. The speed of agitation is adjusted to 30 r.p.m. and the temperature of polymerization is rapidly adjusted to and maintained at 51° C which corresponds to a relative pressure of 8 bars in the polymerizer. The polymerization in the polymerizer lasts 9.5 hours.

There is recovered after degassing with a yield of 75% a powder copolymer of vinyl chloride, vinyl acetate and propylene of the following composition by weight: vinyl chloride 95%, vinyl acetate 2.9% and propylene 2.1% having a viscosity index of 89. The part of said copolymer passing a sieve of 630 microns aperture represents 86% by weight and has an apparent density of 0.61 g/cm³ and a grain size distribution comprising a single population of grains of which the mean diameter is 129 microns, as shown in Table 7 below which indicates the percentages by weight of fines passing different sieves.

Table 7

| Size of apertures in microns | 630 | 400 | 315 | 250 | 200 | 160 | 125 | 100 | 80 | 63 | 40 |
|---|---|---|---|---|---|---|---|---|---|---|---|

Table 7-continued

| % fines | 100 | 97 | 96 | 95 | 90 | 80 | 75 | 22 | 15 | 12 | 11 |

EXAMPLE 10

The procedure of Example 9 is followed but introducing to the prepolymerizer 210 grams of dimethacrylate of triethylene glycol. The reaction proceeds to the same manner.

There is recovered with a yield of 75% a powder copolymer of vinyl chloride, vinyl acetate and propylene having the following composition by weight: vinyl chloride 95%, vinyl acetate 2.9%, propylene 2.1% The viscosity index is 89. The part of said copolymer passing a sieve of aperture 630 microns represents 90% by weight and has an apparent density of 0.57 g/cm$^3$ with a grain size distribution comprising a single population of grains of which the mean diameter is 198 microns, as shown in Table 8 below which indicates the percentages by weight of fines passing different sieves.

Table 8

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 96 | 85 | 85 | 50 | 49 | 14 | 11 | 9 | 8 | 6 |

EXAMPLE 11

The procedure of Example 1 is followed except that 340 grams of tetraethylene glycol dimethacrylate are introduced into the prepolymerizer. The reaction proceeds in the same manner.

There is recovered with a yield of 75% a powder polymer of viscosity index 120.

The part of said polymer passing a sieve of aperture 630 microns represents 92% by weight and has an apparent density of 0.51 g/cm$^3$. The grain size distribution comprises a single population of grains of which the mean diameter is 207 microns as shown in Table 9 below which indicates a percentage by weight of fines passing different sieves.

Table 9

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 88 | 73 | 72 | 51 | 50 | 49 | 25 | 22 | 19 | 11 |

EXAMPLE 12

The procedure of Example 1 is followed, except that 340 grams of dimethacrylate of ethylene glycol are introduced into the prepolymerizer. The reaction proceeds in the same manner.

There is recovered with a yield of 78% a powder polymer of viscosity index 120. The part of said polymer passing a sieve of aperture 630 microns represents 92% by weight and has an apparent density of 0.51 g/cm$^3$. The grain size distribution comprises a single population of grains of which the mean diameter is 204 microns as shown in Table 10 below which shows the percentages by weight of fines passing different sieves.

Table 10

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 90 | 76 | 75 | 46 | 45 | 43 | 29 | 26 | 24 | 8 |

EXAMPLE 13

This example is given for comparison.

In a vertical prepolymerizer of 20 liters volume equipped with a turbine agitator, there is introduced 17 kilograms of vinyl chloride and the apparatus is purged by degassing of 2 kilograms of vinyl chloride. There is introduced 1 gram of ethyl peroxy dicarbonate corresponding to 0.09 grams of active oxygen. The speed of agitation is adjusted to 700 r.p.m. The temperature of the reaction medium in the prepolymerizer is adjusted to and maintained at 68° C which corresponds to a relative pressure of 11.5 bars in the prepolymerizer.

After 1 hour of prepolymerization, the degree of polymerization being about 12%, the prepolymeric composition is transferred to a vertical polymerizer of 60 liters volume equipped with a helicoidal ribbon agitator and previously purged by degassing of 4 kilograms of vinyl chloride. The polymerizer contains 10 kilograms of vinyl chloride and 8.65 grams of acetyl cyclohexane sulfonyl peroxide corresponding to 0.625 grams of active oxygen. The speed of agitation is adjusted to 50 r.p.m. The temperature of polymerization is rapidly adjusted to and maintained at 52° C corresponding to a relative pressure of 7.3 bars in the polymerizer. The polymerization in the polymerizer lasts 5.5 hours.

There is recovered after degassing with a yield of 70% a powder polymer of viscosity index 120.

The part of said polymer passing a 630 microns sieve represents 91% by weight and has an apparent density of 0.52 g/cm$^3$ and a grain size distribution comprising a single population of grains of which the mean diameter is 118 microns, as shown in Table 11 below indicating the percentages by weight of fines passing different sieves.

Table 11

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 100 | 100 | 100 | 100 | 99 | 72 | 10 | 2 | 2 | 0 |

EXAMPLE 14

Using the procedure of Example 13, 30 grams of acrylic acid are introduced into the prepolymerizer. The reaction proceeds in the same way.

There is recovered with a yield of 70% a powder polymer of viscosity index 117. The part of said polymer passing a sieve of apertures of 630 microns represents 80% by weight and has an apparent density of 0.44 g/cm$^3$ and a grain size distribution comprising a single population of grains of which the mean diameter is 309 microns as shown in Table 12 below which indicates the percentages by weight of fines passing different sieves.

Table 12

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 76 | 65 | 32 | 22 | 12 | 5 | 4 | 4 | 4 | 4 |

Example 15

Using the procedure of Example 13, 30 grams of methyl methacrylate are introduced into the prepolymerizer. The reaction proceeds in the same way but the polymerization in the polymerizer lasts 6.5 hours.

There is obtained with a yield of 70% a powder polymer of viscosity index 121. The part of said polymer passing a sieve of 630 microns apertures represents 88% by weight and has an apparent density of 0.52 g/cm$^3$ and a grain size distribution comprising a single population of grains of which the mean diameter is 198 microns as shown in Table 13 below indicating the percentages by weight of fines passing different sieves.

Table 13

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 98 | 96 | 60 | 10 | 3 | 2 | 2 | 2 | 0 |

EXAMPLE 16

Following the procedure of Example 13, 30 grams of ethyl acrylate are introduced into the prepolymerizer. The reaction proceeds in the same manner.

There is recovered with a yield of 70% a powder polymer of viscoisty index 122. The part of said polymer passing a 630 microns sieve represents 87% by weight and has an apparent density of 0.55 grams per cm$^3$. The grain size distribution comprises a single population of grains of which the means diameter is 182 microns.

Table 14 below shows the percentages by weight of fines passing different sieves.

Table 14

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 98 | 96 | 77 | 20 | 5 | 5 | 5 | 4 | 3 |

Example 17

Using the procedure of Example 13, 30 grams of glycidyl methacrylate are introduced into the prepolymerizer. The reaction proceeds in the same manner. There is recovered with a yield of 70% a powder polymer of viscosity index 126. The part of said polymer passing a sieve of apertures of 630 microns represents 85% by weight and has an apparent density of 0.51 g/cm$^3$ and a grain size distribution comprising a single population of grains of which the mean diameter is 209 microns, as shown in Table 15 below which indicates the proportion by weight of fines passing different sieves.

Table 15

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 97 | 88 | 39 | 9 | 6 | 5 | 5 | 5 | 4 |

Example 18

Using the procedure of Example 13, 30 grams of allyl acrylate are introduced into the prepolymerizer. The reaction proceeds in the same manner but the polymerization in the polymerizer lasts 6 hours.

There is recovered with a yield of 70% a powder polymer of viscosity index 96. The part of said polymer passing a sieve of aperture 630 microns represents 90% by weight and has an apparent density of 0.52 g/cm$^3$ and a grain size distribution comprising a single population of grains of which the mean diameter is 227 microns, as shown in Table 16 below which shows the percentages by weight of fines passing different sieves.

Table 16

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 98 | 95 | 81 | 22 | 7 | 4 | 3 | 3 | 2 | 1 |

EXAMPLE 19

The procedure of Example 13 is followed, except that 30 grams of methyl acrylate are introduced into the prepolymerizer. The reaction proceeds in the same manner, but the polymerization in the polymerizer takes 6.5 hours.

There is recovered with a yield of 70% a powder polymer of viscosity index 117. The part of said polymer passing a sieve of aperture 630 microns represents 89% by weight and has an apparent density of 0.51 g/cm³ and a grain size distribution comprising a single population of grains of which the mean diameter is 142 microns, as shown in Table 17 below indicating the percentages by weight of fines passing different sieves.

Table 17

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 99 | 99 | 99 | 96 | 13 | 1 | 1 | 1 | 0 |

EXAMPLE 20

Using the procedure of Example 13, 30 grams of 2-ethyl hexyl acrylate are introduced into the prepolymerizer. The reaction proceeds in the same manner.

There is recovered with a yield of 70% a powder polymer of viscosity index 120. The part of said polymer passing a 630 microns sieve represents 93% by weight and has an apparent density of 0.54 g/cm³ and a grain size distribution comprising a single population of grains of which the mean diameter is 151 microns, as shown in the Table 18 below, indicating the percentages by weight of fines passing different sieves.

Table 18

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 99 | 99 | 97 | 78 | 5 | 3 | 3 | 2 | 0 |

EXAMPLE 21

Using the procedure of Example 13, 30 grams of ethylene glycol methacrylate are introduced into the prepolymerizer. The reaction proceeds in the same manner but the polymerization in the polymerizer lasts 6.5 hours.

There is recovered with a yield of 70% a powder polymer of viscosity index 117. The part of said polymer passing a seive of aperture 630 microns represents 92% by weight and has an apparent density of 0.52 g/cm³ and a grain size distribution comprising a single population of grains of which the mean diameter is 214 microns as shown in Table 19 below, indicating the percentes by weight of fines passing different sieves.

Table 19

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 96 | 80 | 34 | 13 | 7 | 6 | 6 | 5 | 5 |

EXAMPLE 22

Using the procedure of Example 13, 30 grams of propylene glycol methacrylate are introduced into the prepolymerizer. The reaction proceeds in the same manner but the polymerization in the polymerizer takes 6.5 hours.

There is recovered with a yield of 70% a powder polymer of viscosity index 117. The part of said polymer passing a sieve of aperture 630 microns represents 94% by weight and has an apparent density of 0.56 g/cm³ and a grain size distribution comprising a single population of grains of which the means diameter is 219 microns, as shown in Table 20 below indicating the percentages by weight of fines passing different sieves.

Table 20

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 97 | 84 | 27 | 7 | 4 | 4 | 4 | 3 | 3 |

EXAMPLE 23

Using the procedure of Example 13, 30 grams of tripropylene glycol dimethacrylate are introduced into the prepolymerizer. The reaction proceeds in the same manner.

There is recovered with a yield of 70% a powder polymer of viscosity index 116. The part of said polymer passing a sieve of aperture 630microns represents 92% by weight and has an apparent density of 0.52 g/cm³ and a grain size distribution comprising a single population of grains of which the mean diameter is 227 microns as shown in Table 21 below, which indicates the percentages by weight of fines passing different sieves.

Table 21

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 94 | 80 | 20 | 9 | 4 | 3 | 2 | 2 | 1 |

EXAMPLE 24

Using the procedure of Example 13, 60 grams of methyl methacrylate are introduced in the prepolymerizer. The reaction proceeds in the same manner, but the polymerization in the polymerizer lasts 6.5 hours.

There is recovered with a yield of 70% a powder polymer of viscosity index 117. The part of said polymer passing a sieve of apertures of 630microns represents 85% by weight and has an aparent density of 0.48 g/cm³ and a grain size distribution comprising a single population of grains of which the means diameter is 270 microns, as shown in Table 22 below indicating percentages by weight of fines passing different Table 22

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 98 | 92 | 19 | 8 | 8 | 7 | 4 | 1 | 1 | 1 |

EXAMPLE 25

Using the procedure of Example 5, 200 grams of methyl methacrylate are introduced into the prepolymerizer. The reaction proceeds in the same manner, but the polymerization in the polymerizer takes 6 hours.

There is recovered with a yield of 75% a powder copolymer of vinyl chloride and vinyl acetate containing 98% by weight of vinyl choride and 2% by weight of vinyl acetate of viscosity index 83. The part of said copolymer passing a 630 microns sieve represents 90% by weight and has an apparent density of 0.61 g/cm³. The grain size distribution comprises a single population of grains of which the mean diameter is 206 microns as shown in Table 23 below which indicates the percentages by weight of fines passing different sieves.

Table 23

| Size of apertures in microns | 630 | 400 | 315 | 250 | 200 | 160 | 125 | 100 | 80 | 53 | 40 |
|---|---|---|---|---|---|---|---|---|---|---|---|
| % fines | 100 | 99 | 97 | 90 | 42 | 12 | 6 | 5 | 5 | 3 | 1 |

EXAMPLE 26

Using the procedure of Example 5, 200 grams of allyl acrylate are introduced into the prepolymerizer. The reaction proceeds in the same manner but the polymerization in the polymerizer takes 6 hours.

There is recovered with a yield of 78% a powder copolymer of vinyl chloride and vinyl acetate containing 98% by weight of vinyl chloride and 2% by weight of vinyl acetate of viscosity index 66. The part of said copolymer passing a sieve having apertures of 630 microns represents 80% by weight and has an apparent density of 0.69 g/cm³. The grain size distribution comprises a single population of grains of which the mean diameter is 225 microns as shown in Table 24 below, which indicates the percentages by weight of fines passing different sieves.

Table 24

| Size of apertures in microns | 630 | 400 | 315 | 230 | 200 | 160 | 125 | 100 | 80 | 63 | 40 |
|---|---|---|---|---|---|---|---|---|---|---|---|
| % fines | 100 | 99 | 96 | 85 | 17 | 9 | 3 | 3 | 2 | 1 | 1 |

EXAMPLE 27

Using the procedure of Example 7, 200 grams of methyl methacrylate are introduced into the prepolymerizer. The reaction is carried out in the same manner and the polymerization in the polymerizer takes 6.25 hours.

There is recovered with a yield of 69% a powder copolymer of vinyl chloride and propylene comprising 95% by weight of vinyl chloride and 5% by weight of propylene of viscosity index 57.

The part of said copolymer passing a sieve of apertures of 630 microns represents 90% by weight and has an apparent density of 0.72 g/cm³. The grain size distribution comprises a single population of grains of which the mean diameter is 199 microns as shown in Table 25 below, which indicates the percentages by weight of fines passing different sieves.

Table 25

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 98 | 92 | 45 | 15 | 9 | 8 | 7 | 5 | 2 |

EXAMPLE 28

Using the procedure of Example 7, 200 grams of ethyl acrylate are introduced into the prepolymerizer. The reaction proceeds in the same manner but the polymerization in the polymerizer takes 5.75 hours.

There is recovered with a yield of 71% a powder copolymer of vinyl chloride and propylene comprising 95% by weight of vinyl chloride and 5% by weight of propylene of viscosity index 58. The part of said copolymer passing a sieve of apertures of 630 microns represents 88% by weight and has an apparent density of 0.71 g/cm³. The grain size distribution comprises a single population of grains of which the mean diameter is 183 microns as shown in Table 26 below which indicates the percentages by weight of fines passing different sieves.

Table 26

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 98 | 96 | 77 | 20 | 5 | 5 | 4 | 4 | 3 |

EXAMPLE 29

Using the procedure of Example 9, 200 grams of methyl methacrylate are introduced into the prepolymerizer. The reaction proceeds in the same manner, but the polymerization in the polymerizer takes 10.25 hours.

There is recovered with a yield of 72% a powder copolymer of vinyl chloride, vinyl acetate and propylene having the following weight composition: 95% vinyl chloride, 3% vinyl acetate and 2% propylene. The viscosity index is 90. The part of the copolymer passing a sieve of apertures of 630 microns represents 85% by weight and has an apparent density of 0.59 g/cm³. The grain size distribution comprises a single population of grains of which the mean diameter is 197 microns as shown in Table 27 below which indicates percentages by weight of fines passing different sieves.

Table 27

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 98 | 96 | 60 | 10 | 3 | 2 | 2 | 2 | 1 |

EXAMPLE 30

Using the procedure of Example 9, 200 grams of ethyl acrylate are introduced into the prepolymerizer. The reaction proceeds in the same manner.

There is obtained with a yield of 75% a powder copolymer of vinyl chloride, vinyl acetate and propylene having the following composition by weight: 95% vinyl chloride, 2.9% vinyl acetate and 2.1% propylene. The viscosity index is 89. The part of the said copolymer passing a sieve of 630 microns apertures represents 87% by weight and has an apparent density of 0.6 g/cm³. The grain size distribution comprises a single population of grains of which the mean diameter is 187 microns as shown in Table 28 below which indicates the percentages by weight of fines passing different sieves.

Table 28

| Size of apertures in microns | 630 | 400 | 315 | 250 | 200 | 160 | 125 | 100 | 80 | 63 | 40 |
|---|---|---|---|---|---|---|---|---|---|---|---|
| % fines | 100 | 99 | 98 | 93 | 63 | 30 | 5 | 5 | 4 | 4 | 4 |

EXAMPLE 31

The apparatus is that used in Example 1. Preparation of prepolymeric composition (A)

There is introduced in the prepolymerizer 100 kilograms of vinyl chloride and the apparatus is purged by degassing of 10 kilograms of vinyl chloride. There is introduced 7 grams of ethyl peroxy dicarbonate corresponding to 0.630 grams of active oxygen and 360 grams of triethylene glycol dimethacrylate. The speed of agitation is adjusted to 400 r.p.m. The temperature of the reaction medium in the prepolymerizer is adjusted to and maintained at 68° C which corresponds to a relative pressure of 11.5 bars in the prepolymerizer.

After 1 hour of prepolymerization, the extent of the reaction being about 12%, the prepolymeric composition (A) obtained is transferred into the polymerizer, which was previously purged by degassing of 20 kilograms of vinyl chloride, contining 20 kilograms of vinyl chloride.

Preparation of prepolymeric composition (B)

There is introduced into the prepolymerizer 100 kilograms of vinyl chloride and the apparatus is purged by degassing of 10 kilograms of vinyl chloride. There is introduced 13.9 grams of acetyl cyclohexane sulfonyl peroxide, corresponding to 1 gram of active oxygen. The speed of agitation is adjusted to 700 r.p.m. and the temperature of the reaction mixture in the prepolymerizer is adjusted to and maintained at 52.5° C corresponding to a relative pressure of 7.5 bars in the prepolymerizer.

After 1 hour of prepolymerization, the extent of the reaction being about 10%, the composition B obtained is transferred to the polymerizer.

Final Polymerization

There is introduced to the polymerizer 100 grams of lauroyl peroxide corresponding to 4 grams of active oxygen. The speed of agitation is adjusted to 30 r.p.m. The temperature of polymerization is rapidly adjusted to and maintained at 68° C which corresponds to a relative pressure of 11.5 bars in the polymerizer. Polymerization in the polymerizer continues for 6 hours.

There is recovered after degassing with a yield of 80% a powder polymer of viscosity index 81. The part of said polymer passing a sieve of apertures of 630 microns represents 90% by weight and has an apparent density of 0.70 g/cm³ and a grain size distribution comprising 2 populations of grains representing respectively 33 and 67% by weight of the mixture of which the mean diameters are respectively 360 microns and 63 microns.

The grain size distribution is given in Table 29 below which indicates the percentages by weight of fines passing different sieves.

Table 29

| Size of apertures in microns | 630 | 500 | 400 | 315 | 250 | 200 | 160 | 125 | 100 | 80 | 63 | 40 |
|---|---|---|---|---|---|---|---|---|---|---|---|---|
| % fines | 100 | 97 | 89 | 82 | 69 | 68 | 67 | 67 | 66 | 64 | 27 | 3 |

EXAMPLE 32

The apparatus is as used in Example 1.

Preparation of prepolymeric composition (A)

There is introduced in the prepolymerizer 125 kilograms of vinyl chloride and the apparatus is purged by degassing of 15 kilograms of vinyl chloride.

There is introduced 7.33 grams of ethyl peroxy dicarbonate corresponding to 0.660 grams of active oxygen and 330 grams of methyl methacrylate. The speed of agitation is adjusted to 400 r.p.m. per minute and the temperature of the reaction medium in the prepolymerizer is adjusted to and maintained at 68° C which corresponds to a relative pressure of 11.5 bars in the prepolymerizer.

After 1 hour of prepolymerization, the extent of conversion being about 10%, the prepolymeric composition (A) obtained is transferred to a polymerizer previously purged by degassing of 20 kilograms of vinyl chloride.

Preparation of prepolymeric composition (B)

There is introduced in the prepolymerizer 125 kilograms of vinyl chloride and the apparatus purged by degassing of 15 kilograms of vinyl chloride. There is introduced 6.11 grams of ethyl peroxy dicarbonate corresponding to 0.550 grams of active oxygen. The speed of agitation is adjusted to 500 r.p.m. and the temperature of the reaction medium in the prepolymerizer is adjusted to and maintained at 68° C which corresponds to a relative pressure of 11.5 bars in the prepolymerizer.

After 1 hour of prepolymerization, the extent of the reaction being 10%, the prepolymeric composition (B) obtained is transferred to the polymerizer.

Final polymerization

There is introduced into the polymerizer 44.5 grams of ethyl peroxy dicarbonate corresponding to 4 grams of active oxygen and the charge in the polymerizer is adjusted by degassing of 20 kilograms of vinyl chloride. The agitation speed is adjusted to 30 r.p.m. The temperature of the polymerization is rapidly adjusted to and maintained at 52° C, which corresponds to a relative pressure of 7.3 bars in the polymerizer. The polymerization in the polymerizer continues for 5.5 hours. There is recovered, after degassing, with a yield of 83% a powder polymer of viscosity index 115. The part of said polymer passing a sieve having apertures of 630 microns represents 94% by weight and has an apparent density of 0.60 g/cm$^3$. The grain size distribution comprises two populations of grains representing 38% and 62% by weight of which the mean diameters are respectively 439 and 135 microns.

This distribution is shown in Table 30 below which indicates the percentages in weight of fines passing different sieves.

Final polymerization

There is introduced to the polymerizer 37.8 grams of ethyl peroxy dicarbonate corresponding to 3.4 grams of active oxygen and the charge in the polymerizer is adjusted by degassing of 60 kilograms of vinyl chloride. The speed of agitation is adjusted to 50 r.p.m. The polymerization temperature is rapidly adjusted to and maintained at 51 ° C which corresponds to a relative pressure of 7.2 bars in the polymerizer. The polymerization in the polymerizer lasts 6.5 hours.

There is recovered after degassing with a yield of 70% a powder polymer of viscosity index 125. The part of said polymer passing a sieve of aperture 630 microns represents 90% by weight and has an apparent density of 0.54 g/cm$^3$. The grain size distribution comprises two populations of grains representing respectively 40% and 60% by weight of which the mean diameters are respectively 373 and 131 microns. The grain size distribution is given in Table 31 below which indicates the percentages by weight of fines passing different sieves.

Table 31

| Size of apertures in microns | 630 | 500 | 400 | 315 | 250 | 200 | 160 | 125 | 100 | 80 | 63 | 40 |
|---|---|---|---|---|---|---|---|---|---|---|---|---|
| % fines | 100 | 99 | 86 | 70 | 60 | 58 | 45 | 35 | 10 | 1 | 1 | 0 |

Table 30

| Size of apertures in microns | 630 | 500 | 400 | 315 | 250 | 200 | 160 | 125 | 100 | 80 | 63 | 40 |
|---|---|---|---|---|---|---|---|---|---|---|---|---|
| % fines | 100 | 98 | 68 | 63 | 62 | 60 | 57 | 17 | 4 | 3 | 3 | 2 |

EXAMPLE 33

There is used the same prepolymerizer as in Example 1 and a vertical polymerizer made of stainless steel, having a capacity of 400 liters and equipped with a screw agitator.

Preparation of prepolymeric composition (A)

There is introduced in the prepolymerizer 160 kilograms of vinyl chloride and the apparatus is purged by degassing of 10 kilograms of vinyl chloride. There is introduced 10 grams of ethyl peroxy dicarbonate corresponding to 0.90 grams of active oxygen and 450 grams of methyl methacrylate. The agitation speed is adjusted to 400 r.p.m., the temperature in the reaction medium in the prepolymerizer is adjusted to and maintained at 68° C which corresponds to a relative pressure of 11.5 bars in the prepolymerizer.

After 1 hour of prepolymerization, with the extent of the reaction being about 10%, the prepolymeric composition (A) is transferred to the polymerizer previously purged by degassing of 20 kilograms of vinyl chloride.

Preparation of prepolymeric composition (B)

The composition (B) is prepared under the same conditions as in Example 32 and transferred to the polymerizer.

It will be understood that various changes and modifications can be made in the details of procedure, formulation and use without departing from the spirit of the invention, especially as defined in the following claims.

We claim:

1. In a process for the preparation of polymers and copolymers of vinyl chloride by bulk polymerization, the improvement in producing polymers and copolymers having a relatively narrow grain size distribution and a relatively large average grain diameter comprising carrying out the polymerization under low agitation of a reaction medium consisting essentially of vinyl chloride and a prepolymeric composition (A), said prepolymeric composition being obtained by polymerization under high turbulence, to a conversion of about 5 to 15%, of a monomeric composition based on vinyl chloride in the presence of 0.05 to 2% by weight of an auxiliary compound selected from (a) acrylic acid or methacrylic acid, (b) a substituted or unsubstituted aliphatic ester of acrylic or methacrylic acids, (c) ethylene glycol dimethacrylate or polyethylene glycol dimethacrylate, or (d) propylene glycol dimethacrylate or polypropylene glycol dimethacrylate with the prepolymeric composition (A) being present in the reaction medium in an amount sufficient to provide a population of polymers and copolymers having a grain size distribution in which the mean diameter is at least equal to about 150 microns.

2. A process as claimed in claim 1 in which the aliphatic group of the ester is substituted by an alcohol, epoxide, etheroxide or polyetheroxide functional group.

3. A process as claimed in claim 1 in which the aliphatic group of the ester has a straight or branched chain, saturated or unsaturated, or cyclic.

4. A process as claimed in claim 1 in which the substituted or unsubstituted aliphatic group of the ester has from 1 to 24 carbon atoms.

5. A process as claimed in claim 1 in which the polyethylene glycol dimethacrylate is triethylene glycol dimethacrylate or tetraethylene glycol dimethacrylate.

6. A process as claimed in claim 1 in which the polypropylene glycol dimethacrylate is tripropylene glycol dimethacrylate.

7. In a process for the preparation of polymers and copolymers of vinyl chloride by bulk polymerization, the improvement in producing polymers and copolymers having a relatively narrow grain size distribution and a relatively large average grain diameter comprising carrying out the polymerization under low agitation of a reaction medium consisting essentially of vinyl chloride, a prepolymeric compostion (A), said prepolymeric composition being obtained by polymerization under high turbulence, to a conversion of about 5 to 15%, of a monomeric composition based on vinyl chloride in the presence of 0.05 to 2% by weight of an auxiliary compound selected from (a) acrylic acid or methacrylic acid, (b) a substituted or unsubstituted aliphatic ester of acrylic or methacrylic acids, (c) ethylene glycol dimethacrylate or polyethylene glycol dimethacrylate, or (d) propylene glycol dimethacrylate or polypropylene glycol dimethacrylate, and a prepolymeric composition (B) obtained by polymerization under high turbulence, to a conversion of about 5 to 15%, of a monomeric composition based on vinyl chloride not containing said auxiliary compound, with the contents by weight of the particles of prepolymer composition (A) in relation to the total weight of prepolymer particles in the reaction medium varying from 50 to 100% and with the prepolymeric composition (A) being present in the reaction medium in an amount sufficient to provide a population of polymers and copolymers having a grain size distribution in which the mean diameter is at least equal to about 150 microns.

* * * * *